(12) United States Patent
Young et al.

(10) Patent No.: US 7,586,736 B2
(45) Date of Patent: Sep. 8, 2009

(54) ELECTRICAL INSULATION SYSTEM AND METHOD FOR ELECTRICAL POWER STORAGE COMPONENT SEPARATION

(75) Inventors: Charlie Young, Hillsboro, OR (US); Ted Guzman, Gresham, OR (US)

(73) Assignee: Micro Power Electronics Inc., Hillsboro, OR (US)

( * ) Notice: Subject to any disclaimer, the term of this patent is extended or adjusted under 35 U.S.C. 154(b) by 406 days.

(21) Appl. No.: 11/420,708

(22) Filed: May 26, 2006

(65) Prior Publication Data
US 2007/0009791 A1 Jan. 11, 2007

Related U.S. Application Data

(60) Provisional application No. 60/698,294, filed on Jul. 11, 2005.

(51) Int. Cl.
*H01G 9/00* (2006.01)

(52) U.S. Cl. .................. 361/502; 361/503; 361/504; 361/508; 361/509; 361/512; 429/99; 429/156; 429/158

(58) Field of Classification Search .............. 361/502, 361/503–504, 509–512, 523; 429/156, 158, 429/159, 99
See application file for complete search history.

(56) References Cited

U.S. PATENT DOCUMENTS

| | | | |
|---|---|---|---|
| 5,384,212 A | 1/1995 | Heiman et al. | |
| 5,395,263 A | 3/1995 | Sandell | |
| 5,631,098 A | 5/1997 | Suzuki | |
| 5,756,229 A | 5/1998 | Pyszczek et al. | |
| 5,977,746 A | 11/1999 | Hershberger et al. | |
| 6,045,949 A | 4/2000 | Kuipers et al. | |
| 6,063,518 A * | 5/2000 | Dewulf et al. | 429/53 |
| 6,110,618 A * | 8/2000 | Vacheron et al. | 429/100 |
| 6,119,864 A | 9/2000 | Kessler et al. | |
| 6,146,783 A * | 11/2000 | Brohm et al. | 429/62 |
| 6,190,794 B1 * | 2/2001 | Wyser | 429/94 |
| 6,558,835 B1 * | 5/2003 | Kurisu et al. | 429/159 |
| 6,899,975 B2 | 5/2005 | Watanabe et al. | |
| 6,913,852 B2 * | 7/2005 | Nakanishi et al. | 429/99 |
| 7,160,644 B2 * | 1/2007 | White et al. | 429/99 |
| 2005/0077873 A1 | 4/2005 | Watson et al. | |
| 2006/0091852 A1 | 5/2006 | Watson et al. | |
| 2009/0061301 A1 | 3/2009 | Planck | |

FOREIGN PATENT DOCUMENTS

| | | |
|---|---|---|
| DE | 10134145 | 2/2003 |
| EP | 1635416 | 3/2006 |
| WO | WO-2005038954 | 4/2005 |

* cited by examiner

*Primary Examiner*—Nguyen T Ha
(74) *Attorney, Agent, or Firm*—Perkins Coie LLP

(57) ABSTRACT

An electrical insulation system and method for electrical power storage component separation is disclosed. Some implementations of the system use various forms of polyurethane elastomer based material such as tapes to electrically separate various components of electrical power storage devices such as battery packs. These components can include cells, connecting tabs, printed circuit assemblies, solder joints, nickel strips, and other conductive members.

20 Claims, 5 Drawing Sheets

ELECTRICAL INSULATION SYSTEM AND METHOD FOR ELECTRICAL POWER STORAGE COMPONENT SEPARATION

CROSS REFERENCE TO RELATED APPLICATION

This application claims priority benefit of provisional application Ser. No. 60/698,294 filed Jul. 11, 2005.

BACKGROUND OF THE INVENTION

1. Field of the Invention

The present invention is generally related to electrical storage devices.

2. Description of the Related Art

Battery packs can contain various electrically related components that require electrical separation from one another by using electrical insulation in order to avoid malfunctions and electrical hazards such as caused by unwanted short circuits. Unfortunately, conventional electrical insulation materials used for this electrical separation, such as kapton, nomex, or fishpaper insulators, can be damaged relatively easily through normal use in contacting these components. The components can contain various surfaces, some of which can have relatively sharp areas that may puncture, cut or otherwise breach or penetrate the electrical insulating materials to void the desired electrical separation required of the electrical insulating materials. As a consequence, hazardous conditions can result.

BRIEF DESCRIPTION OF THE SEVERAL VIEWS OF THE DRAWING(S)

DETAILED DESCRIPTION OF THE INVENTION

An electrical insulation system and method for electrical power storage component separation is disclosed herein. Some implementations of the system use various forms of polyurethane elastomer based material or other such materials to electrically separate various components of electrical power storage devices such as battery packs. The polyurethane elastomer material and other such materials has sufficient durability to maintain electrical separation between the various components over a typical life of system operation despite forces that can be applied to the material by components and other surfaces of the system during such life. These components can include cells, connecting tabs, printed circuit assemblies, solder joints, nickel strips, wires, and other conductive members. The components can have sharp edges, abrasive surfaces, protruding members, or other unsmooth areas configured to penetrate conventional insulating materials when a force typical to a life of the electrical storage system is applied unto the conventional insulating material by an unsmooth area of a component or other structure of the electrical storage system. Indicators for durability of a material to withstand forces applied to the material by unsmooth areas during system life include, but are not limited to, tensile strength at break of the material of the material and elongation length at break of the material.

Material properties of the polyurethane elastomer based materials, such as polyurethane tapes, may be used to increase reliability of electrical separation found in the electrical power storage devices utilizing the system. For instance, unlike conventional insulating materials, the polyurethane elastomer based materials can be more resistant to puncture and other penetration by various components to maintain electrical separation between components.

Resistance to puncture and other penetration can help contribute to reliability of electrical storage devices such as within electrical storage packs using internal insulation to electrically separate battery cells from nickel strips, solder wires, printed circuit assemblies and other conductive components that can pose puncture problems for conventional insulation materials. Consequently, the potential for electrical hazards, such as internal electrical shorts, to occur between portions of electrical storage devices may be reduced and the reliability of the electrical power storage devices may be improved.

Figure 1:
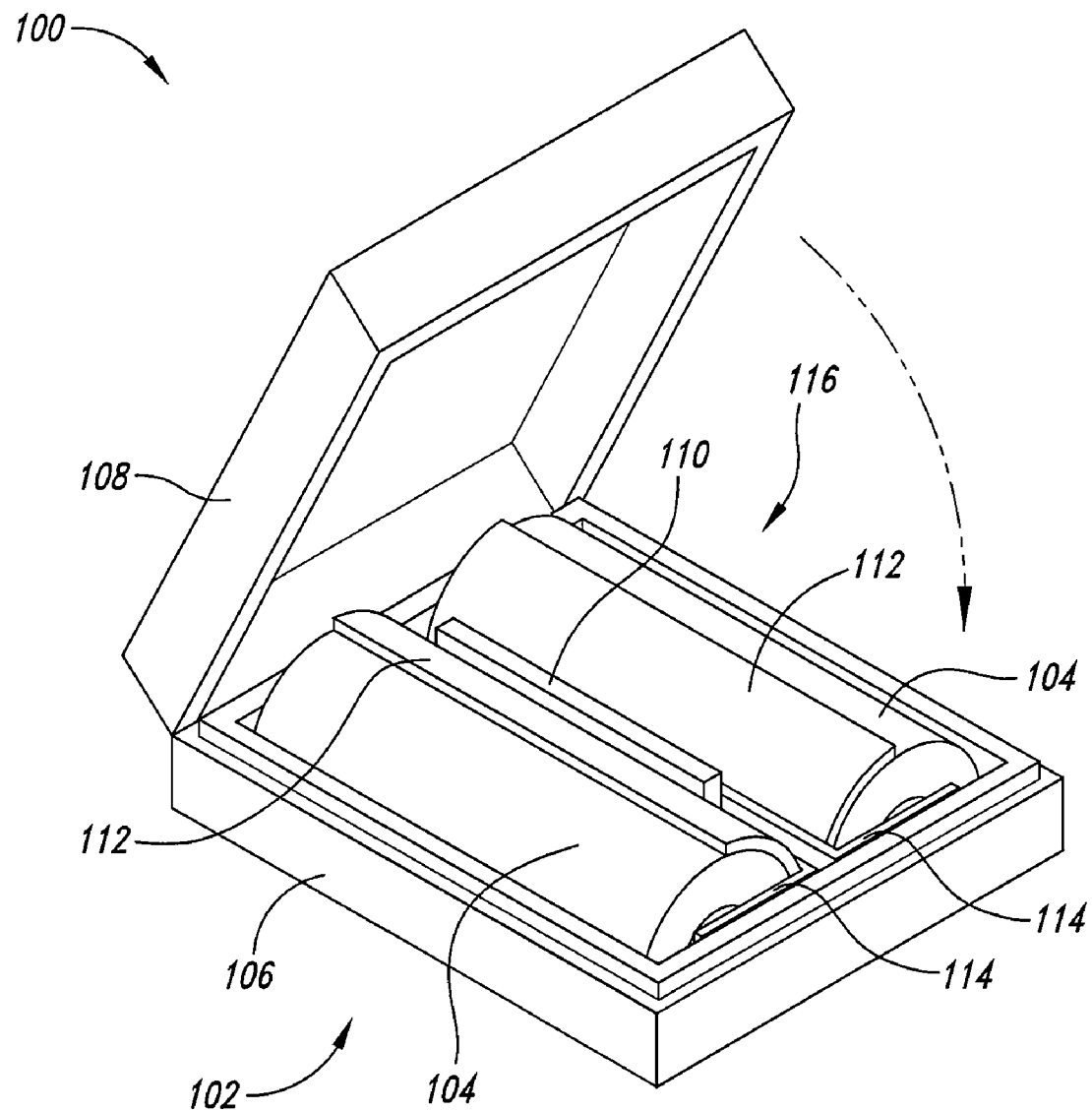
FIG. 1 is an isometric view of a battery pack containing an electrical insulation system.
Figure 2:
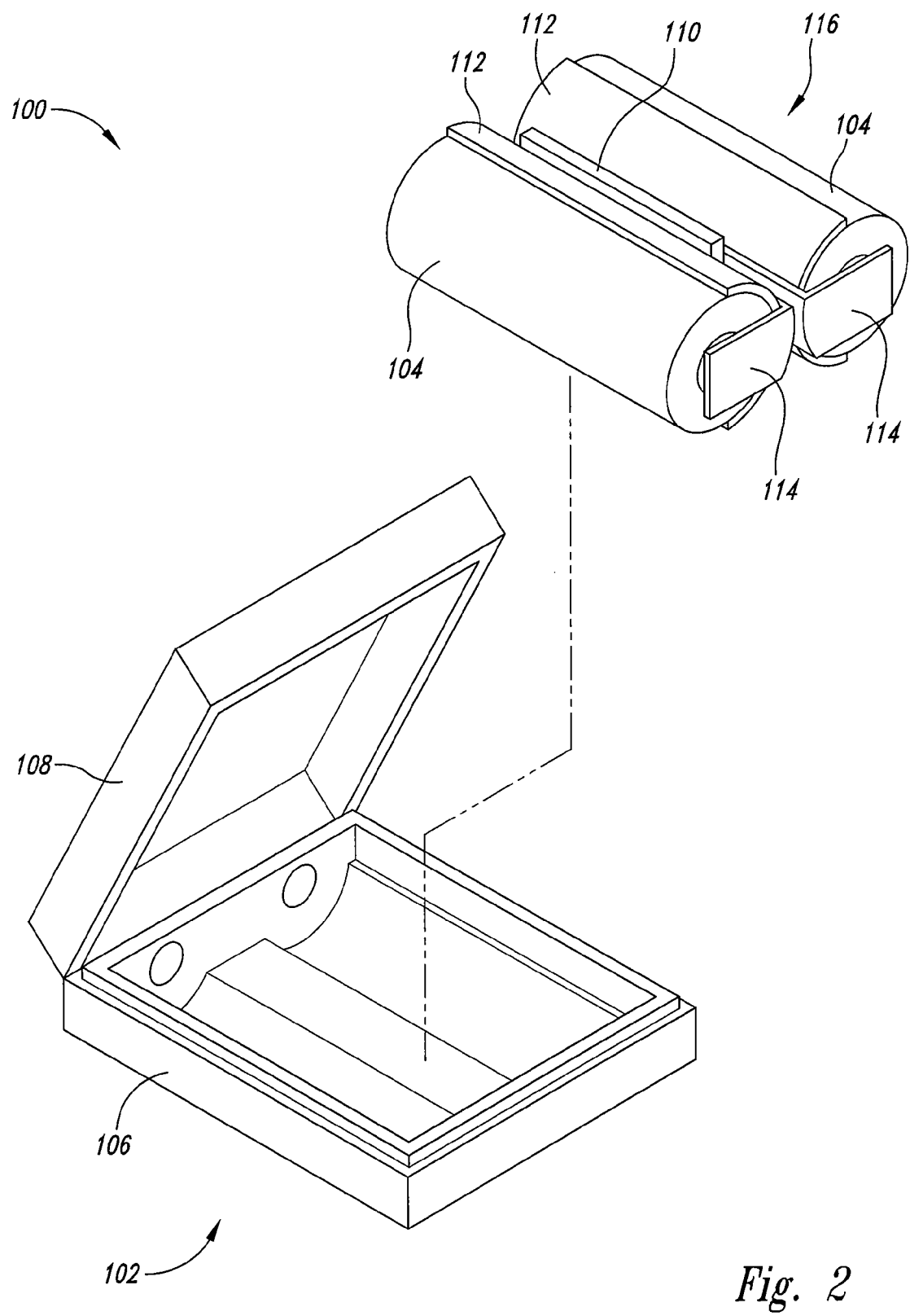
FIG. 2 is a partially exploded isometric view of the battery pack of FIG. 1.

An exemplary battery pack 100 incorporating an electrical insulating system 102 is shown in FIG. 1. The battery pack 100 has two battery cells 104, a case 106, a case cover 108 and a printed circuit assembly 110 with first conductive portions 110a and second conductive portions 110b (shown in FIG. 3). The insulating system 102 includes cell covers 112 and conductor covers. Each of the cell covers 112 is shaped to cover a longitudinal portion of one of the battery cells 104.

Figure 3:
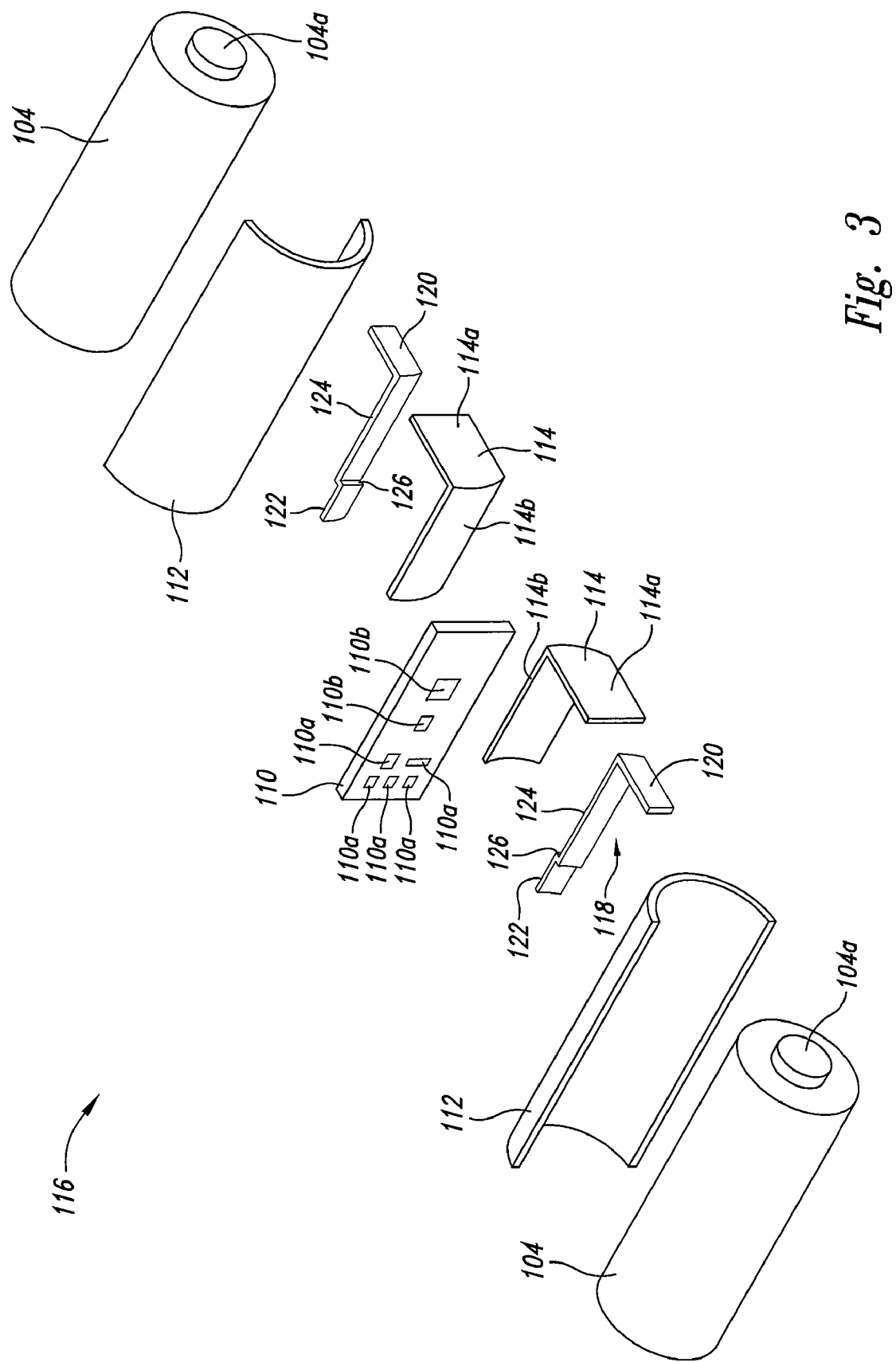
FIG. 3 is an exploded isometric view of a battery subassembly of the battery pack of FIG. 1.
Figure 4:
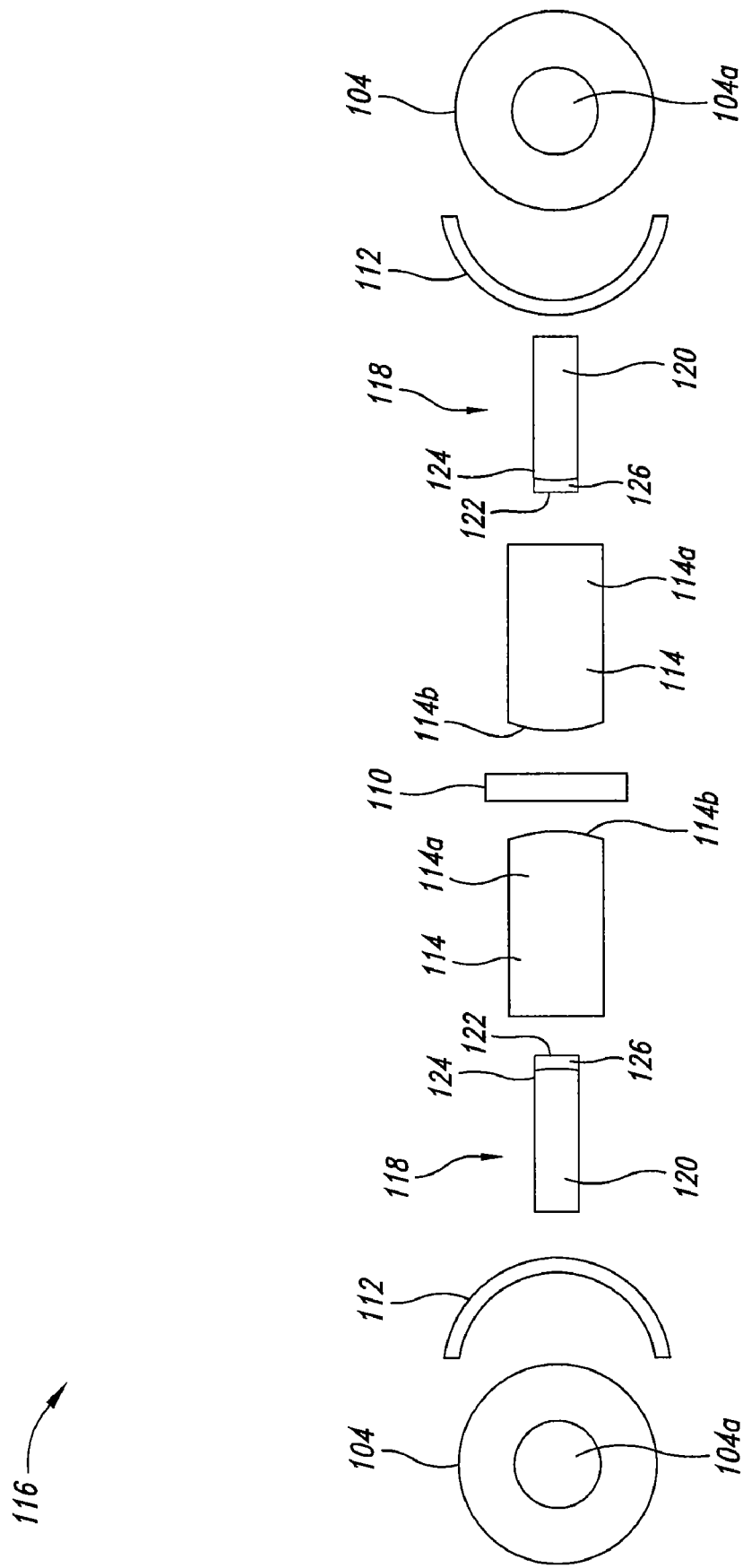
FIG. 4 is an exploded side elevational view of the battery subassembly of in FIG. 3.
Figure 5:
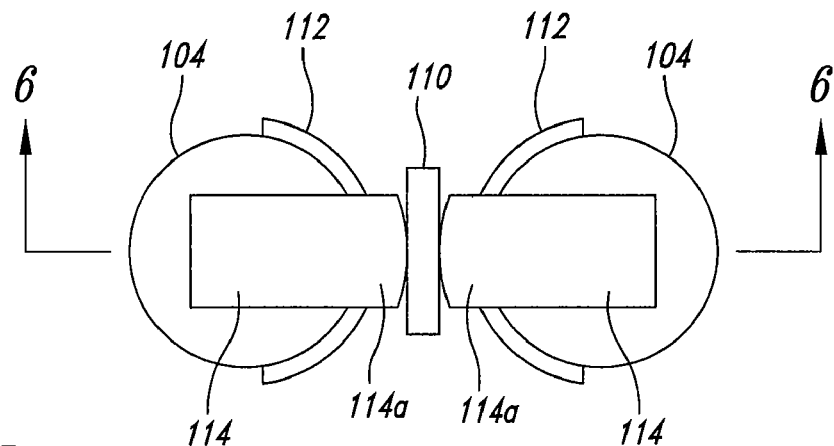
FIG. 5 is a side elevational view of the battery subassembly of FIG. 3.
Figure 6:
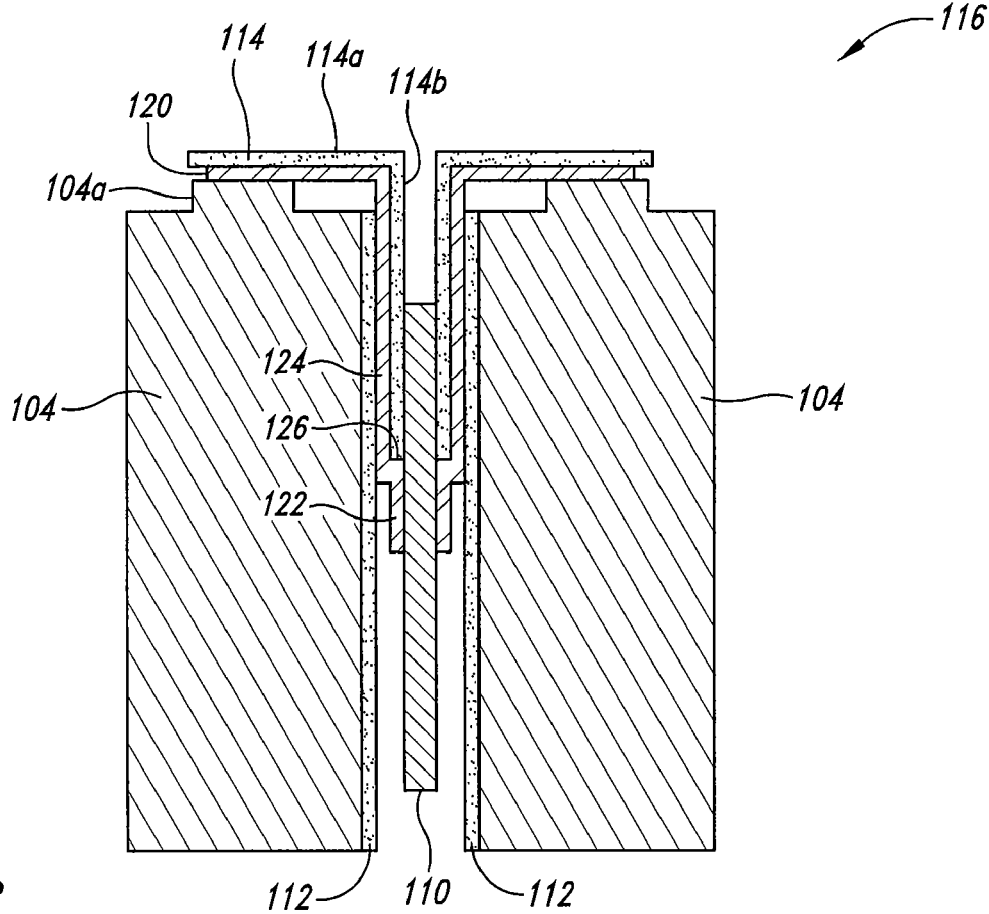
FIG. 6 is a cross-sectional view of the battery subassembly taken substantially along line 6-6 of FIG. 5.

A battery pack sub-assembly 116, shown in FIGS. 2-6, includes the insulating system 102, the two battery cells 104, and electrical conducting strips 118. The conductor covers 114 of the insulating system 102 each have a first portion 114a and a second portion 114b at approximately ninety-degrees with each other as shown in FIG. 3. The electrical conducting strips 118 are each shaped to contact a positive terminal 104a of one of the battery cells 104 with a first end portion 120 of the strip and also to contact the first conductive portions 110a of the printed circuit assembly 110 with a second end portion 122 of the strip.

A mid-portion 124 of the conductive strip 118 has a contoured portion 126 with two approximate ninety-degree bends to accommodate placement of the second portion 114b of the conductor cover 114 between the mid-portion of the conductive strip and the second conductive portions 110b of the printed circuit assembly 110. The contoured portion 126 of the conductive strip 118 allows for the second end portion 122 of the conductive strip 118 to contact the first conductive portions 110a of the printed circuit assembly 110 while the second portion 114b of the conductor cover 114 is in juxtaposition with the second conductive portions 110b of the printed circuit assembly.

The cell covers 112 and the conductor covers 114 are made from polyurethane elastomer based tapes to resist potential puncture. In some implementations the polyurethane elastomer based tapes utilize Minnesota Mining and Manufacturing Polyurethane Protective Tape 8562 indoor grade having a typical tensile strength at break per ASTM D882 of approximately 40 pounds per inch and elongation strength at break typically of approximately 400%.

From the foregoing it will be appreciated that, although specific embodiments of the invention have been described herein for purposes of illustration, various modifications may

The invention claimed is

1. An electrical storage system having a life, the system comprising:
    an electrical battery cell including a first portion and a first terminal;
    an electrically conductive member including a first portion and a second portion, the first portion positioned to contact the first terminal; and
    electrical insulating material at least a portion of which is in juxtaposition between the first portion of the electrical battery cell and the second portion of the electrically conductive member, at least one of the first portion of the electrical battery cell and the second portion of the electrically conductive member having an unsmooth area, the material having sufficient durability to resist forces imparted onto the material by the unsmooth area during the life of the electrical storage system to maintain electrical separation between the first portion of the electrical battery cell and the second portion of the electrically conductive member.

2. The system of claim 1 wherein the insulating material is tape.

3. The system of claim 1 wherein the insulating material contains polyurethane.

4. The system of claim 1 wherein the insulating material is a polyurethane elastomer.

5. The system of claim 1 wherein the insulating material has a tensile strength at break of at least approximately 40 pounds per square inch.

6. The system of claim 1 wherein the insulating material has an elongation length at break of at least approximately 400% of an unstressed sample.

7. An electrical storage system having a life, the system comprising:
    a printed circuit assembly including a first conductive portion and a second conductive portion;
    an electrically conductive member including a first portion and a second portion, the conductive member being positioned for the first portion of the conductive member to contact the first portion of the printed circuit assembly; and
    a puncture resistant electrical insulating material having a first portion in juxtaposition between the second portion of the conductive member and the second portion of the printed circuit assembly, at least one of the second portion of the conductive member and the second portion of the printed circuit assembly having an unsmooth area, the material having sufficient durability to resist forces imparted onto the material by the unsmooth area during the life of the electrical storage system to maintain electrical separation between the second portion of the conductive member and the second portion of the printed circuit assembly.

8. The system of claim 7 wherein the conductive member has a mid-portion between the first and second portions of the conductive member, the mid-portion having a series of bends to accommodate juxtapositioning of the insulating material between the second portion of the conductive member and the second portion of the printed circuit assembly with the first portion of the conductive member contacting the first portion of the printed circuit assembly.

9. The system of claim 7 wherein the conductive member further comprises a third portion substantially perpendicular to the second portion of the conductive member and wherein the electrical insulating material further comprises a second portion substantially perpendicular to the first portion of the electrical insulating material, the third portion of the conductive member being positioned in juxtaposition with the second portion of the electrical insulating material.

10. The system of claim 9 further comprising a battery cell having a terminal and wherein the third portion of the conductive member is in juxtaposition with the terminal of the battery cell.

11. The system of claim 7 further comprising a battery cell having a terminal and wherein the electrical insulating material includes a second portion and the conductive member has a mid-portion and a third portion, the mid-portion positioned between the first and second portions of the conductive member, the mid-portion having a series of bends to accommodate juxtapositioning of the insulating material between the second portion of the conductive member and the second portion of the printed circuit assembly with the first portion of the conductive member contacting the first portion of the printed circuit assembly, the third portion being substantially perpendicular to the second portion of the conductive member, the second portion of the electrical insulating material being substantially perpendicular to the first portion of the electrical insulating material, the third portion of the conductive member being positioned in juxtaposition with the second portion of the electrical insulating material, the third portion of the conductive member being in juxtaposition with the terminal of the battery cell.

12. A battery pack having a life, the battery pack comprising:
    a printed circuit assembly including a first conductive portion and a second portion;
    a first component with an electrically conducting surface portion with an unsmooth area; and
    a puncture resistant electrical insulating material having a first portion in juxtaposition between the electrically conducting surface portion of the first component and the second portion of the printed circuit assembly, the material having sufficient durability to resist forces imparted onto the material by the unsmooth area and the second portion of the printed circuit assembly during the life of the electrical storage system to maintain electrical separation between the electrically conducting surface portion of the first component and the second portion of the printed circuit assembly.

13. An electrical storage system, comprising:
    an electrical battery cell including a first portion and a first terminal;
    an electrically conductive member including a first portion and a second portion, the first portion of the electrically conductive member positioned to contact the first terminal of the electrical battery cell; and
    insulating material at least a portion of which is positioned between the first portion of the electrical battery cell and the second portion of the electrically conductive member, at least one of the first portion of the electrical battery cell and the second portion of the electrically conductive member having an area with at least one of an abrasive surface, a sharp edge, and a protruding member, the insulating material having sufficient durability to resist at least surface penetration by the area to maintain separation between the first portion of the electrical battery cell and the second portion of the electrically conductive member.

14. The electrical storage system of claim 13 wherein the electrically conductive member further includes a third portion, the insulating material is first insulating material, the area is a first area, and wherein the electrical storage system further comprises:

a circuit including a conductive first portion and a second portion, the conductive first portion of the circuit positioned to contact the third portion of the electrically conductive member; and second insulating material at least a portion of which is positioned between the second portion of the electrically conductive member and the second portion of the circuit, at least one of the second portion of the electrically conductive member and the second portion of the circuit having a second area with at least one of an abrasive surface, a sharp edge, and a protruding member, the second insulating material having sufficient durability to resist at least surface penetration by the second area to maintain separation between the second portion of the electrically conductive member and the second portion of the circuit.

15. The electrical storage system of claim 14 wherein the electrically conductive member includes at least one bend to accommodate contact between the third portion of the electrically conductive member and the conductive first portion of the circuit.

16. The electrical storage system of claim 14 wherein the second insulating material includes a first portion and a second portion generally perpendicular to the first portion.

17. The electrical storage system of claim 13 wherein the first and second portions of the electrically conductive member are generally perpendicular.

18. The electrical storage system of claim 13 wherein the insulating material has a curvilinear cross-section.

19. The electrical storage system of claim 13 wherein the insulating material includes polymeric material.

20. The electrical storage system of claim 13 wherein the insulating material includes tape.

\* \* \* \* \*